(12) United States Patent
Silverman

(10) Patent No.: US 6,263,057 B1
(45) Date of Patent: Jul. 17, 2001

(54) AUTOMATIC TELECOMMUNICATIONS PROVIDER SELECTION SYSTEM

(75) Inventor: David Phillip Silverman, Somerville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/306,956

(22) Filed: May 7, 1999

(51) Int. Cl.[7] .......................... H04M 15/00; H04M 11/00
(52) U.S. Cl. ................... 379/114; 379/115; 379/100.04; 379/100.03
(58) Field of Search .................................. 379/112, 114, 379/144, 221, 220, 222, 115, 93.01, 93.06, 93.08, 93.09, 100.01, 100.04; 370/238; 358/505, 506, 442, 440

(56) References Cited

U.S. PATENT DOCUMENTS

| | | | |
|---|---|---|---|
| 5,095,372 | * | 3/1992 | Silverberg ........................ 358/401 |
| 5,764,741 | * | 6/1998 | Barak ................................ 379/114 |
| 5,790,642 | * | 8/1998 | Taylor et al. .................... 379/112 |
| 5,799,072 | * | 8/1998 | Vulcan et al. ................... 379/112 |
| 5,862,203 | * | 1/1999 | Vulcan et al. ................... 379/114 |
| 5,999,598 | * | 12/1999 | Hendrick et al. ............. 379/100.01 |
| 6,032,193 | * | 2/2000 | Wegner et al. .................. 709/238 |
| 6,052,449 | * | 4/2000 | Chavez, Jr. ..................... 379/114 |

* cited by examiner

*Primary Examiner*—Curtis Kuntz
*Assistant Examiner*—Rexford Barnie
(74) *Attorney, Agent, or Firm*—Barry H. Freedman

(57) ABSTRACT

The invention provides methods and apparatuses for the automatic selection of a telecommunications service provider, for example, an inter-exchange or intra-exchange service provider, from a number of available telecommunications service providers, for a call from a calling station to a called station so that the toll charge for the call is minimized. Specifically, the selection of the least-cost telecommunications service provider is based on an analysis of (a) the estimated duration of the call which is determined in a variety of ways, including using historical call data of the calling station, and (b) telecommunications service provider toll rates and, in particular, current telecommunications service provider discount calling plans. Based on the result of the analysis, the calling station is connected to the selected least-cost telecommunications service provider network so that the toll charge for the particular call is minimized.

2 Claims, 4 Drawing Sheets

US 6,263,057 B1

AUTOMATIC TELECOMMUNICATIONS PROVIDER SELECTION SYSTEM

FIELD OF THE INVENTION

The invention relates generally to telecommunications networks and, more particularly, to a telecommunications service provider selection system.

BACKGROUND OF THE INVENTION

For telephone call purposes, a geopolitical area, such as the United States, is divided into a plurality of contiguous, non-overlapping districts called exchanges, each of which is served by a Local Exchange Carrier (LEC). The exchanges are also referred to as Local Access Transport Areas (LATAs). Telephone calls originating and terminating within the same exchange, referred to as intra-exchange calls, are handled end-to-end by an intra-exchange service provider or LEC. Calls originating within one exchange or in a foreign country and terminating in a different exchange or in a foreign country, referred to as inter-exchange calls, are handled at each end by the intra-exchange service provider that services the originating and the terminating exchanges. These inter-exchange calls are carried between the intra-exchange service providers by one or more inter-exchange service providers, generally known as Long Distance companies.

For certain telephone calls, for example, those that progress beyond the LEC (e.g., inter-exchange calls), a long distance toll charge is typically levied on a per call basis. In addition, certain intra-exchange calls also levy a toll charge, for example, those that progress beyond a flat rate billing area for a particular consumer. The flat rate billing area is typically some small geographic zone within an exchange within which a particular consumer can originate unlimited calls for a fixed dollar amount.

An inter-exchange service provider can be selected by consumers on a per call basis by the use of an access code (e.g., 10—10XXX) which identifies the selected service provider and which is entered from a calling station when the call is placed. For example, even if the calling station is pre-subscribed for a particular inter-exchange service provider, another one can be selected by dialing, before the usual ten digit number, an access code in a prescribed format, where some of the digits are the code for a particular service provider. Entry of the access code will override the pre-subscription and place the call with the toll service provider requested for that call. Similarly, it is estimated that consumers will also be able to select intra-exchange service providers in this manner in the near future.

Because of increasing competition among inter-exchange service providers in providing inter-exchange or long distance toll call services to consumers, inter-exchange service providers have offered a plethora of discounted calling plans to lure consumers and businesses into using their long distance telecommunications services. These discount calling plans are based on such factors as time of day or day of week, bundled minute plans, and the like. For example, one inter-exchange service provider currently offers twenty minutes of long distance toll call service for one dollar.

It is known in the prior art for LECs to offer a service wherein a dialed call is selectively routed to one of many inter-exchange service providers based on user-created data base records. See U.S. Pat. No. 4,866,763 entitled "Interexchange Carrier Automatic Route Selection System" issued Sep. 12, 1989, to Cooper et al. Arrangements are also known in the prior art in which a device chooses which of several telecommunications service providers a call should be routed to based on the call's class of service, for example, time of day for the call, the day of the week for the call, or area code called. See U.S. Pat. No. 5,781,620 entitled "Method and System for Toll Carrier Selection" issued Jul. 14, 1998, to Montgomery et al.

However, such prior art arrangements have not considered all available factors in selecting a least-cost telecommunications service provider on a per call basis. Such factors include, for example, the ever-increasing complexity of discount calling plans being offered by telecommunications service providers (especially the bundling of minutes for fixed dollar amounts) and the lack of uniformity in customer calling patterns. As a result, such prior art arrangements can route a call to an inappropriate or higher-cost telecommunications service provider than is necessary or desired.

SUMMARY OF THE INVENTION

The invention is directed to the automatic selection of a telecommunications service provider, for example, an inter-exchange service provider (IXC), from a number of available telecommunications service providers, for a call from a calling station to a selected called station that uses an estimated call duration to minimize the toll charge. The estimated call duration can be determined in a variety of ways, including using historical call data of the calling station. Once the estimated call duration is determined, this information is used in conjunction with telecommunications service provider toll rates and, in particular, current discount calling plans, to determine the least-cost telecommunications service provider for the particular call.

In an illustrative embodiment of the invention, a telecommunications switch receives information relating to a call from a calling station to a selected called station. A database which is accessible by the switch, contains (i) toll rate information, including current discount calling plans from relating to a plurality of telecommunications service providers, and (ii) historical information indicative of previous call durations between the calling station and a plurality of called stations, which includes the selected called station. The switch determines an estimated call duration for the call from the historical information. Then the switch selects a telecommunications service provider having the lowest toll rate for the call by analyzing the toll rate information in view of the estimated call duration. Thereafter, the switch connects the calling station to the selected telecommunications service provider network.

In another illustrative embodiment of the present invention, a facsimile device is arranged to transmit a facsimile message with one or more transmittal pages, to a selected called station. The facsimile device includes a processor and a database containing toll rate information, including current discount calling plans from a plurality of telecommunications service providers. For a particular facsimile call, the processor determines (i) the number of transmittal pages and (ii) an estimated per-page transmission time. Using this information the processor determines an estimated call duration. Then, the processor selects the telecommunications service provider having the lowest toll charge for the call by analyzing the toll rate information in view of the estimated call duration. Thereafter, the processor connects the facsimile device to the selected telecommunications service provider network.

BRIEF DESCRIPTION OF THE DRAWING

The invention will be more readily understood after reading the following detailed description taken in conjunction with the accompanying drawing, in which.

DETAILED DESCRIPTION

Figure 1:
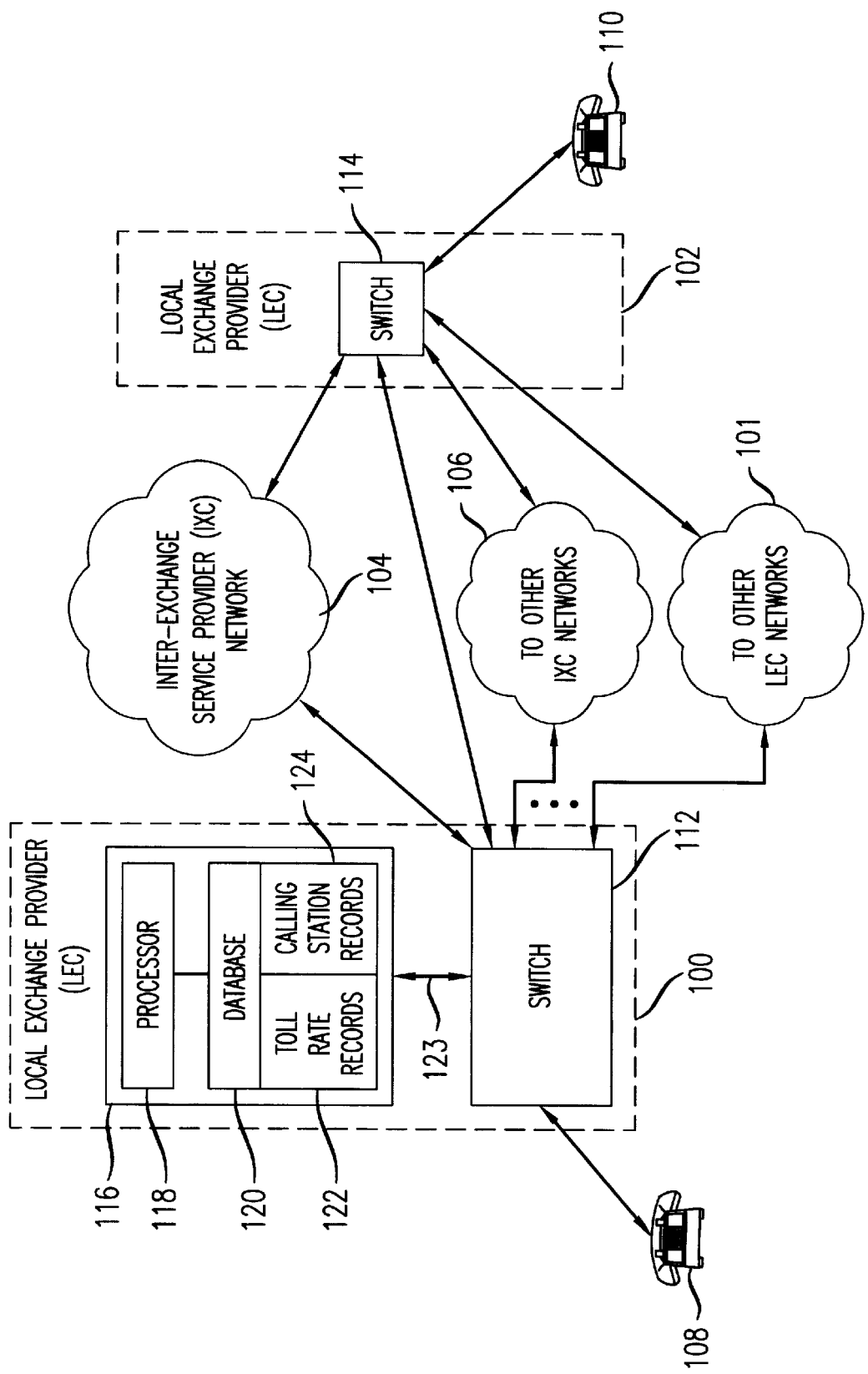
FIGS. 1 and 2 are block diagrams of illustrative telecommunications networks in which the automatic telecommunications service provider selection is implemented.

FIG. 1 is a block diagram of a telephone network in which the automatic telecommunications service provider selection is implemented. It will be recognized that FIG. 1 is simplified for explanation purposes and that the full network environment for the invention will comprise multiple end-offices and provisions for network reliability through redundancy, all of which need not be shown here. The network illustratively includes several interconnected telecommunications service provider networks: local exchange carrier (LEC) networks 100, 101 and 102 and inter-exchange carrier (IXC) networks 104 and 106. These networks all provide services to subscribers associated with stations 108 and 110.

LECs each have telecommunication switches, such as switch 112, interconnected with user lines coupled to the stations. Switch 112 and 114 may be one of a number of well-known types of telecommunication switching equipment such as Lucent Technologies 5ESS® Electronic Switching System. Switch 112 may have a number of IXC and LEC resources that allow stations to establish call connections (through a trunk group, for example) with multiple IXCs and LECs, such as the IXC networks 104 and 106 and LEC networks 100, 101 and 102. Switch 112 is coupled by a data link 123 to an automatic telecommunications service provider selection apparatus 1 16, in accordance with the principles of the present invention.

Although stations 108 and 110 are shown in FIG. 1 as conventional telephone devices, this arrangement is merely for convenience and it is to be understood that the stations are not limited to telephone devices, per se. The stations may be conventional facsimile machines, computers or other such devices between which communication is established. Similarly, the communication exchanged is not limited to voice communication, and may be in various forms and for various classes of service.

Automatic telecommunications service provider selection apparatus 116, hereinafter "ATSP selection apparatus," includes a processor 118 and a database 120. The majority of logic, control, supervisory and translation functions required for the operation of each ATSP selection apparatus are performed by processor 118 which includes programs for the operations functionally described in FIG. 3. As described in detail below, execution of these programs implements the functionality necessary to use an estimated call duration in conjunction with the telecommunications service providers' (e.g., IXCs and LECs) toll rate information to automatically route a call to the least-cost telecommunications service provider. Processor 118 can be any of a number of commercially available processors. As will be understood by persons skilled in the art, database 120 can be any conventional database/indexing storage means that can store and allow access to records/data.

Database 120 includes toll rate records 122 for a plurality of telecommunications service providers and calling station records 124 for each subscriber of a service, as implemented by the invention. The toll rate records identify, for example, both the basic rate and current discount calling plans or promotions offered by the various telecommunications service providers. The calling station record includes the calling station history information. The calling station history information contains an entry for each call the particular calling station has made, and each entry includes the called station identifier (e.g., telephone number) and the duration of each call. The arrangement or relational tables and processing within database 120 is in accordance with techniques now well known in the art.

The data needed to populate the toll rate records in database 120 is provided by each telecommunications service provider in any of a number of conventional methods. For example, in one method a data link is established between the respective telecommunications service provider and processor 118 to populate the toll rate records and provide updates. Alternatively, the telecommunications service providers can provide this information on a storage medium, such as a compact disc (CD), which is then loaded into the ATSP selection apparatus, thus allowing the ATSP selection apparatus 116 to be continuously updated with the current toll rates and discount plans.

Figure 2:
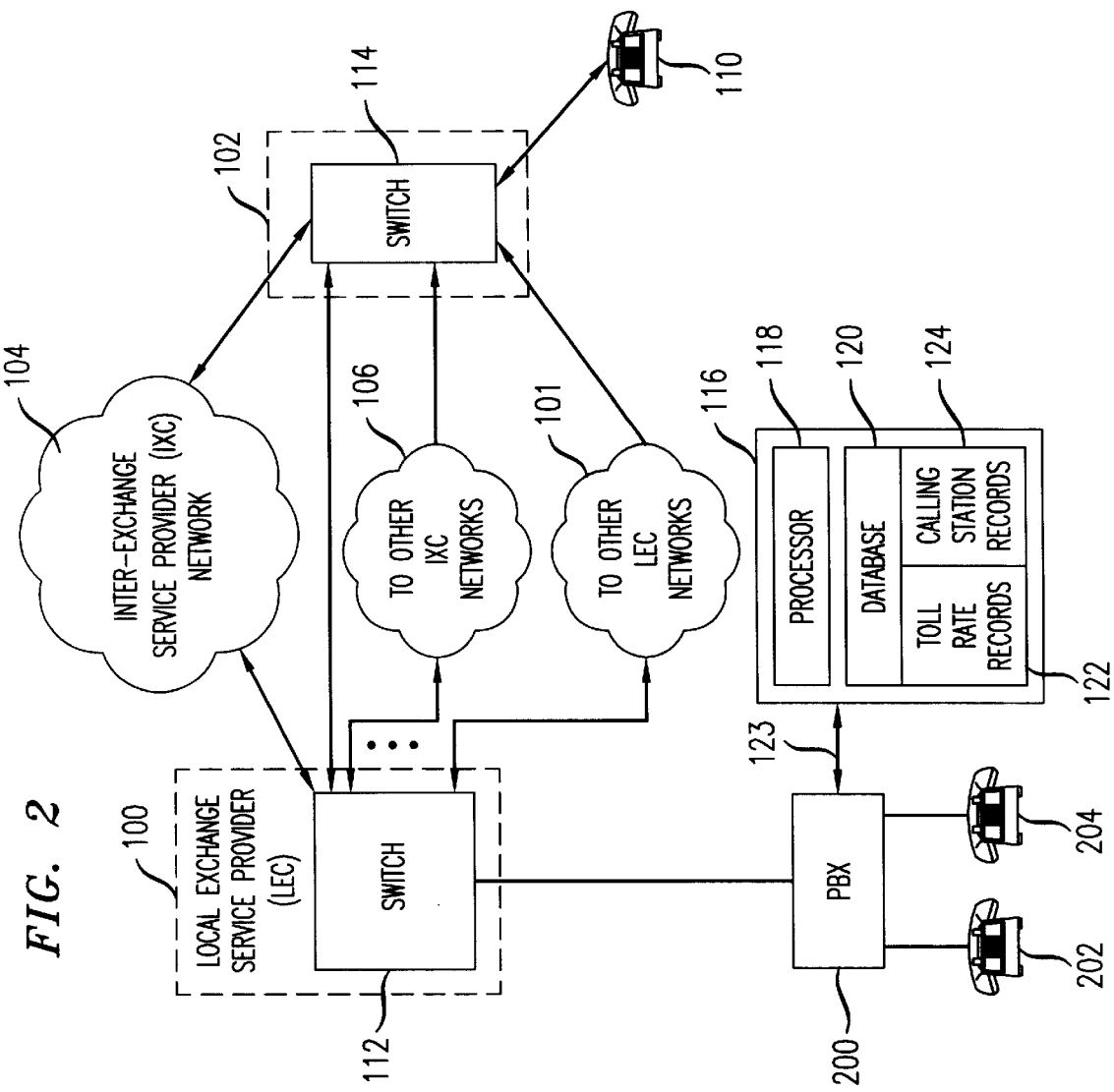

Another illustrative embodiment is shown in FIG. 2 in which a Private Branch Exchange switch 200 (PBX) is located on a subscriber's premises serving a number of stations 202 and 204. The PBX is interconnected with switch 112 and network 100 and is coupled by a data link 123 to ATSP selection apparatus 116.

Alternatively (not shown), ATSP selection apparatus 116 can be integrated into switch 112 of FIG. 1 or PBX 200 of FIG. 2, thus obviating the need for a stand-alone unit. In these embodiments, the processing unit of switch 112 or PBX 200 includes the functionality described in FIG. 3 and their respective databases include the toll rate records and calling station records described above.

Figure 3:
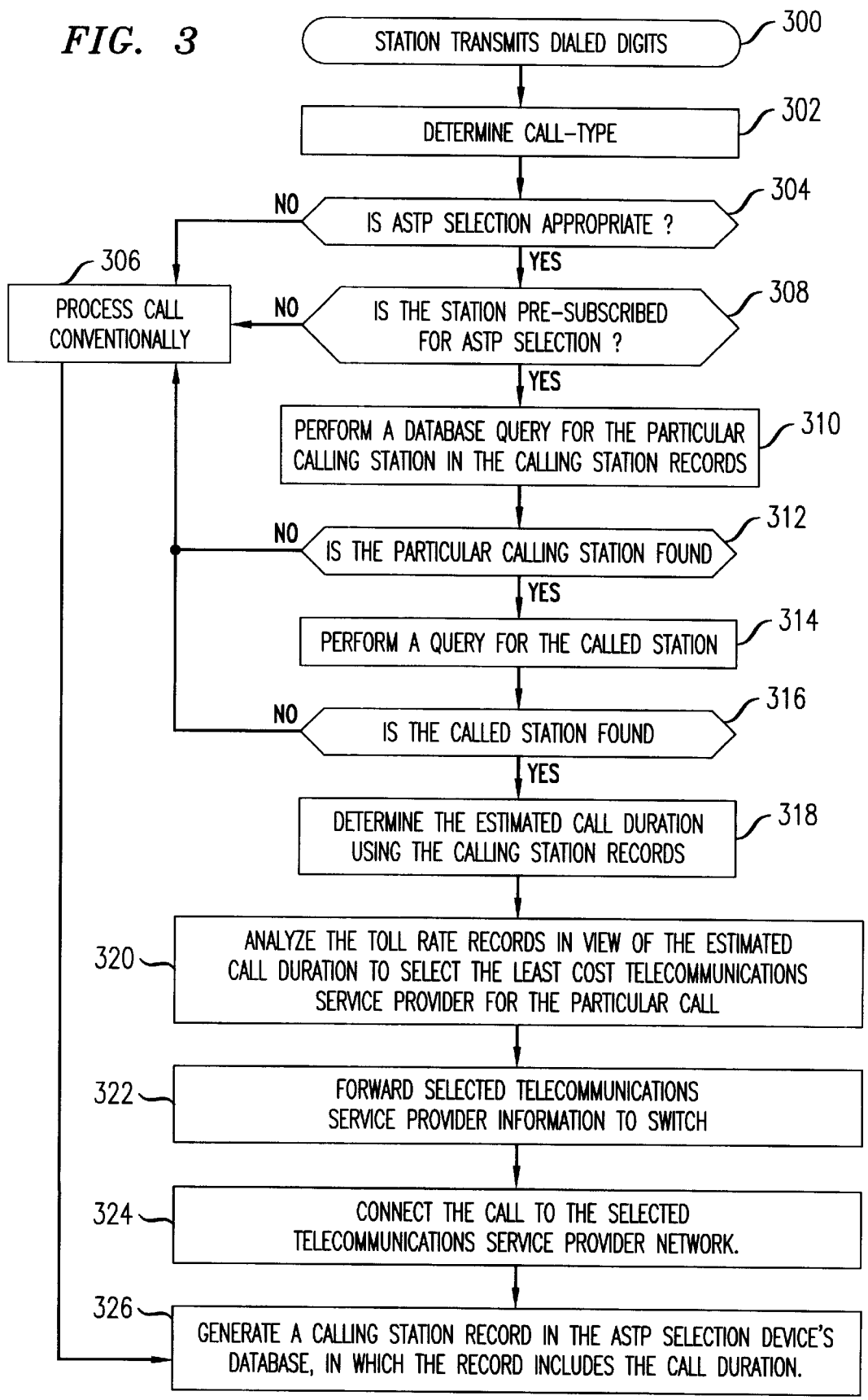
FIG. 3 is a flow chart showing the steps carried out within the networks of FIGS. 1 and 2 to implement the invention.

With simultaneous reference to FIGS. 1 and 3, the process contemplated by the invention is initiated in step 300 of FIG. 3 when a calling station, for example station 108, transmits dialed digits to switch 112 for a call between the calling station and a called station. For simplicity, the embodiment of FIG. 1 is used to describe the operation of the principles of the present invention. However, it is to be understood that the steps described in FIG. 3 are equally applicable to the embodiment of FIG. 2. In this regard, switch 112 of FIG. 1 and PBX 200 of FIG. 3 can be interchanged with regard to the steps described in FIG. 3, except as noted below. At step 302, conventional switch operation occurs, including a determination of: (a) the call type, for example (i) an intra-exchange toll call, (ii) an inter-exchange toll call, or (iii) a non-toll call, and (b) whether a telecommunications service provider access code (e.g., 10—10XXX) has been entered. Next, step 304 uses the information from step 302 to determine whether the ATSP selection apparatus or conventional call routing will be used for the call. If, for example, it is determined that the call is a non-toll intra-exchange call or an access code was entered, the call is diverted to step 306, wherein switch 112 processes the call conventionally and the call is handled by the appropriate telecommunications service provider (e.g., a LEC or a selected IXC). If, however, the call is an inter-exchange or intra-exchange toll call and no overt request for a particular service provider was made, the process continues to step 308. Step 308 determines whether the calling station is pre-subscribed for a service, as implemented by the invention. If not, the call is processed conventionally in step 306.

A message is transmitted, in step 310 from switch 112 via the data link to processor 118 to perform a query of database 120 to retrieve the calling station records 124 for the particular calling station. The transmitted message includes information relating to the dialed digits such as the address digits or identity of (1) the calling station (e.g., automatic number identification or ANI) and (2) the called station. Acting on the message, if the processor finds the particular calling station in the calling station records 124 in step 312, the process proceeds to step 314, otherwise the call is processed conventionally in step 306.

Returning to step 314, processor 118 performs a query for the particular called station within the calling station records 124 from step 312. Upon an affirmative answer to that inquiry, processor 118 begins an analysis of the information contained in the calling station records 124 for the particular calling station and called station in step 318. Within processor 118, at step 318, a determination is made as to the estimated call duration of the present call from the calling station to the called station using the historical data of such calls made in the past. For this determination, processor 118 accesses the calling station record information, which includes prior calls to the particular called station and their respective call duration's, and collects all such prior call information for statistical or other mathematical analysis in any of the many known ways. For example, such an analysis may include averaging the prior call durations or using probability theory to determine an expected value for the call duration.

At step 320, processor 118 determines the least-cost telecommunications service provider by using (a) toll rate records 122 and (b) the estimated call duration from step 3 18. In particular, processor 118 first accesses the toll rate records containing the discount calling plan information for the various telecommunications service providers as a function of the local exchange(s) between which the call is to be connected and then performs an analysis of the toll rate records in view of the estimated call duration. For example, the analysis may include calculating the toll charge for each toll rate in database 120. This analysis is carried out within processor 118 and results in an ordered hierarchy of least-cost telecommunications service providers for a given call duration.

In the event there are two or more telecommunications service providers offering the same discount calling plan or toll rates, one or the other may be randomly selected. Alternatively, a subscriber of a service, as implemented by the present invention, may pre-select preferred telecommunications service providers who are defaulted to in the event of equal charges. In any event, processor 118 will make a final determination in step 320 regarding which telecommunications service provider is selected. In step 322, the processor then forwards a message to switch 112 with the selected least-cost telecommunications service provider information.

At step 324, switch 112 uses the provided least-cost telecommunications service provider information to process the call by connecting the calling station to the selected telecommunications service provider network. Similarly, in the embodiment of FIG. 2, PBX switch 200 uses the selected least-cost telecommunications service provider information to process the call. For example, PBX switch 200 sends the selected least-cost telecommunications service provider information to the LEC switch, i.e., an inter-exchange service provider access code, so that the LEC switch connects the calling station to the selected inter-exchange service provider network.

After the call is completed, in step 326 the processor compiles information regarding the call, including the actual duration of the call, to either add to or update the calling station history information in database 120 of FIGS. 1 and 2. Specifically, the information from step 326 is used to (a) add a new calling station to the calling station records or (b) add a new entry to an existing calling station in the calling station records, or (c) add a new called station entry to an existing calling station in the calling station records. Once a new record or entry has been added to the database, it is used for determining the estimated call duration, in step 318, for the next call to the particular called station. In this manner, the ATSP selection apparatus is continuously updating the calling station records, thus the ATSP selection apparatus provides increasing accuracy in determining estimated call durations the longer a subscriber of such a service utilizes the ATSP selection apparatus.

Optional steps may be included in the operation of the ATSP selection apparatus, for example, to determine whether a call from a particular station is acceptable to the selected least-cost telecommunications service provider. A telecommunications service provider may deny calling privileges to certain stations if, for example, the subscriber associated with the station is delinquent in paying the telecommunications service provider's prior charges for services; thus, the calling station record in database 120 may, for example, contain an indicator for each telecommunications service provider which is periodically updated to indicate whether calls from the particular station can be accepted or not. If calling privileges from a particular station are denied by a telecommunications service provider, the query is again performed in processor 18 at step 320 to determine the next least-cost telecommunications service provider.

Figure 4:
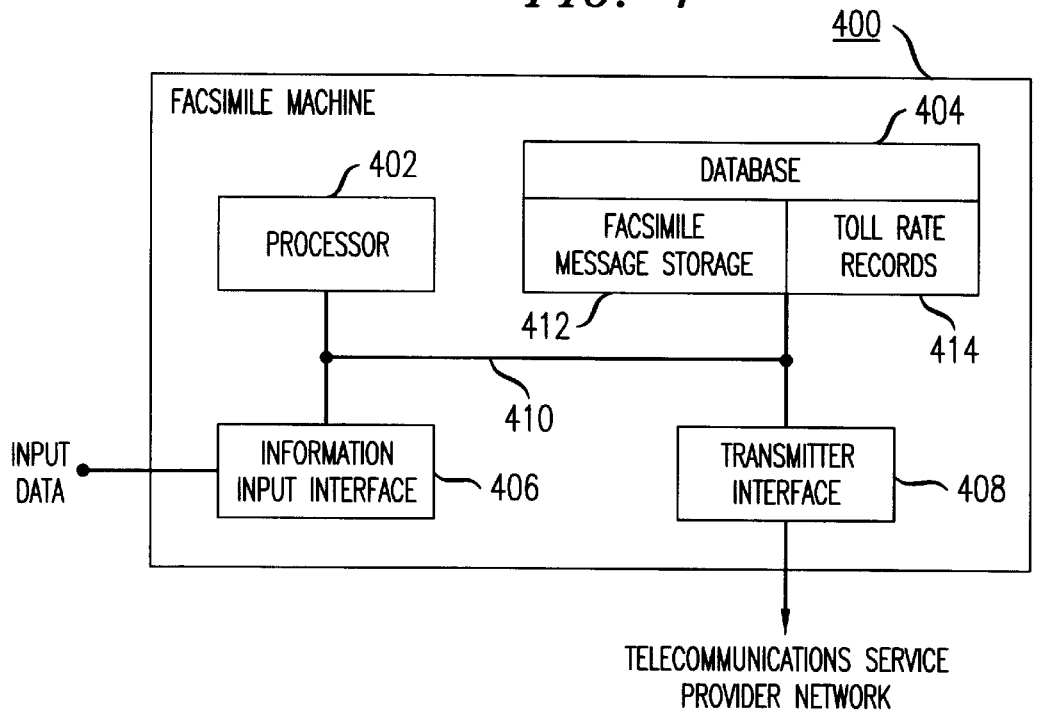
FIG. 4 illustrates an exemplary arrangement for a facsimile device in which the automatic telecommunications service provider selection is implemented.

FIG. 4 illustrates an exemplary arrangement for a facsimile device in which the ATSP selection is implemented. Facsimile device 400 includes a processor 402, a database 404, an information input interface 406, and a transmitting interface 408, all interconnected by a bus 410. In addition to all of the functionality described above for processor 118 of FIG. 1, processor 402 supervises the operations of, and directs data traffic to and from, all the other components of the facsimile device via bus 410, as in a conventional facsimile device. Moreover, database 404 includes facsimile message storage 412, as in a conventional facsimile device, to store data to be faxed, for example, paper input or image input from a computer or the like, via information input interface 406. The facsimile message includes one or more transmittal pages of information. However, unlike prior facsimile machines, database 404 includes toll rate records 414 as described above in database 120 of FIG. 1. Information input interface 406 includes conventional elements, such as a keypad and a scanning device. Transmitter interface 408 also includes conventional elements, such as a facsimile resolution device with a high and low facsimile resolution setting. Stored information in facsimile message storage 412 is output to a telecommunications service provider network (e.g., LEC) via transmitting interface 408. As will be understood by persons skilled in the art, each facsimile device 400 can be implemented as a stand-alone facsimile machine, facsimile modem or facsimile software.

Illustratively, a user provides a facsimile message to be faxed to facsimile device 400 of FIG. 4, for example, via the scanning device, which is stored in facsimile message storage 412. The user enters the telephone number or digits of the receiving party, hereinafter "called station number" into the facsimile device, for example, via the keypad. These operations are performed in a conventional manner and are represented by steps 500 and 502 in FIG. 5.

At step 506, a determination of (a) the call type, for example (i) an intra-exchange toll call, (ii) an inter-exchange call, or (iii) a non-toll call, and (b) whether a telecommunications service provider access code has been entered. This is accomplished in processor 402 in accordance with techniques now well-known in the art, by examining the entered digits of the called station. For example, an entered called station number may include a country code, typically one to three digits, indicating the region or country to which the call is designated, an area or trunk code, typically one to three digits, designating a regional LEC area. Next, step 508 uses the information from step 506 to determine whether the facsimile device will use the ATSP selection or conventional call routing. If, for example, it is determined that the call is a non-toll intra-exchange call (e.g., a flat rate call) or an access code was entered, the call is diverted to step 510, wherein the facsimile device processes the facsimile message conventionally. If, however, the call is a toll call and no overt request for a particular service provider was made, the process continues at step 512.

At step 512, processor 402 determines the estimated call duration using the facsimile message in facsimile message storage 412 in FIG. 4. For this determination, the processor 402 first determines an estimated per-page transmission time for the facsimile device. The processor then uses one of a variety of methods for determining the number of transmittal pages of the facsimile message. For example, the number of transmittal pages for the facsimile message is determined by counting the total number of pages stored in facsimile message storage 412. In another method, only the cover page of the facsimile message is stored, which is then scanned for a data field relating to total the number of pages. Once the number of transmittal pages is known, the estimated call duration is determined by multiplying the number of transmittal pages by the per-page transmission time. The resolution setting of the resolution device will vary the time interval for transmitting each page of information. For example, the facsimile device receives 16 pages of information through the information input interface and the resolution device is set for "high resolution" which requires 30 seconds per page, thus the estimated call duration is 8 minutes. In contrast, a "low resolution" setting requires only 20 seconds per page, thus the estimated call duration is 5 minutes and 33 seconds.

Figure 5:
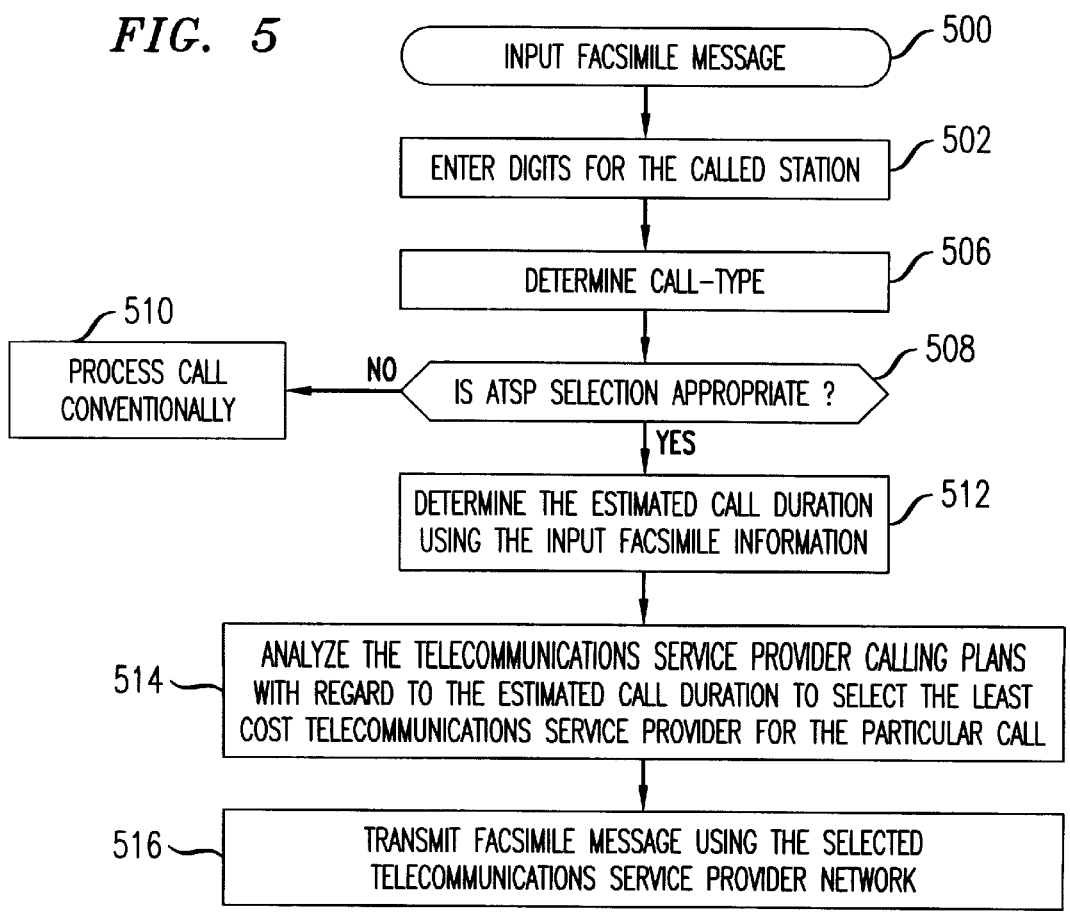
FIG. 5 is a flow chart of the operation of the facsimile device in FIG. 4.

Similar to step 320 of FIG. 3, at step 514 of FIG. 5 the processor selects the least-cost telecommunications service provider by using (a) toll rate records 414 in FIG. 4 and (b) the estimated call duration from step 512 in FIG. 5. In particular, the processor first accesses the toll rate records containing the discount calling plan information for the various telecommunications service providers as a function of the local exchange(s) between which the call is to be connected, and then performs an analysis of the toll rate records in view of the estimated call duration. For example, the analysis may include calculating the toll charge for each toll rate in database 414. This analysis is carried out within processor 402 and results in an ordered hierarchy of least-cost telecommunications service providers for a given call duration.

In step 516, the processor transmits the facsimile message using the selected least-cost telecommunications service provider network. For example, the processor transmits the called station number with the selected telecommunications service provider identity by using the telecommunications service provider's access code to a LEC network. The LEC network, in turn, processes the call conventionally by connecting the facsimile device to the selected telecommunications service provider's network to complete the facsimile transmission.

Finally, it is to be understood that, although the invention is disclosed herein in the context of particular illustrative embodiments, those skilled in the art will be able to devise numerous alternative arrangements. Such alternative arrangements, although not explicitly shown or described herein, embody the principles of the present invention and are thus within its spirit and scope.

What is claimed is:

1. A method for automatically selecting a telecommunications service provider among a plurality of telecommunications service providers for a facsimile call from a calling station to a selected called station so that the toll charge for the call is minimized, the method comprising the steps of:

(a) determining an estimated call duration of the call;

(b) accessing information indicative of the toll rates of the plurality of telecommunications service providers;

(c) selecting a telecommunications service provider having the lowest toll charge for the call by analyzing the toll rate information in conjunction with the estimated call duration; and (d) connecting the calling station to the selected telecommunications service provider network;

wherein the calling station is a facsimile device arranged to transmit a facsimile message, with at least one transmittal page, to the selected called station; and wherein step (a) includes determining the number of transmittal pages of the facsimile message and an estimated per-page transmission time of the facsimile device, and wherein the number of transmittal pages is determined by scanning a page count field on the first transmittal page.

2. An apparatus for automatically selecting a telecommunications service provider among a plurality of telecommunications service providers for routing a facsimile call from a calling station to a selected called station so that the toll charge for the call is minimized, the apparatus comprising:

a database including information indicative of the toll rates of the plurality of telecommunications service providers;

means for determining an estimated call duration of the call; and means for selecting a telecommunications service provider having the lowest toll rate for the call using the estimated call duration and the toll rate information;

wherein the apparatus is a facsimile device arranged to transmit a facsimile message, with at least one transmittal page, to the selected called station; and wherein the determining means determines both the number of transmittal pages of the facsimile message and an estimated per-page transmission time of the facsimile device, and wherein the determining means determines the number of transmittal pages by scanning a page count field on the first transmittal page.

* * * * *